United States Patent [19]
Jullien-Davin

[11] 3,794,286
[45] Feb. 26, 1974

[54] MOULD FOR INJECTION MOULDING PRESSES
[75] Inventor: Jean Jullien-Davin, Valence, France
[73] Assignee: Crouzet, Paris, France
[22] Filed: Mar. 14, 1972
[21] Appl. No.: 234,530

[52] U.S. Cl................... 249/67, 249/68, 425/444, 425/DIG. 51
[51] Int. Cl............................................. B28b 7/10
[58] Field of Search... 249/67, 68, 76; 425/DIG. 51, 425/806, 444; 90/28.1; 225/103; 408/124, 129

[56] References Cited
UNITED STATES PATENTS
2,330,369 9/1943 Marsh.......................... 425/806 UX
2,382,302 8/1945 End..................................... 90/28.1

FOREIGN PATENTS OR APPLICATIONS
2,036,245 2/1971 Germany........................... 425/444

Primary Examiner—H. A. Kilby, Jr.
Attorney, Agent, or Firm—John C. Holman

[57] ABSTRACT

A mould for a press for the injection moulding of thermosetting or thermoplastic materials which opens in two parts in a parting plane and comprises a fixed block and a movable block, wherein there is provided a centre member which has formed therein injection passages and is associated unit the fixed block in such manners as to effect, upon the opening of the mould, a movement of translation followed by a rotation.

3 Claims, 4 Drawing Figures

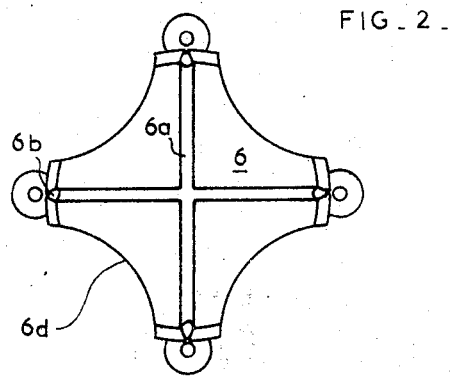
FIG._2_
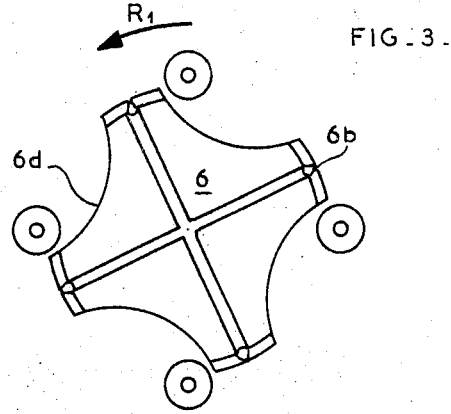
FIG._3_
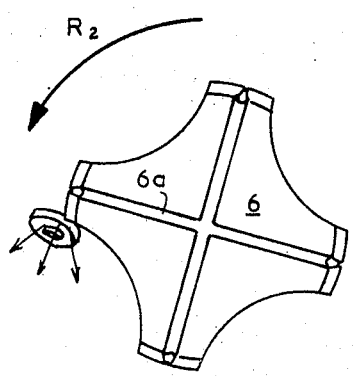
FIG._4_

MOULD FOR INJECTION MOULDING PRESSES

BACKGROUND OF THE INVENTION

The present invention relates to moulds for presses for the injection moulding of thermoplastic or thermosetting materials.

In the design of moulds, it is known to produce a plurality of parts from a single injecting passage, which is connected to branch passages or runners, and to separate the parts from each other and from the residual material by a relative displacement of certain internal elements of the mould, such as disclosed in U.S. Pat. No. 2,994,921. However, if the parts are removed from their mould cavities by ejectors they are liable to adhere to the latter instead of being discharged at the end of the opening of the mould.

By means of the device according to the invention, this drawback can be avoided. In this mould, a member which turns during the opening of the mould, sweeps through the regions immediately above the ejectors so as to expel the moulded parts.

SUMMARY OF THE INVENTION

The mould according to the invention opens in two parts in a single parting or joint plane onto which open the mould cavities which are supplied with moulding material, by way of radially disposed injecting passages or runners, from a main passage located in the centre of the mould. Each passage is defined, on one hand, by a first member integral with the movable block and, on the other hand, by a second member which is integral with the fixed block and located above the parting plane so that the injection can be carried out from above the part to be moulded without changing the periphery, which is very advantageous in the case of a gear wheel or pinion. This second member has a certain degree of freedom; indeed, it can be moved in translation a short distance under the action of a spring which is compressed when the mould is closed and turned by the action of a helical ramp or cam during the opening of the mould. Its first movement of translation separates the moulded parts from the residual material in the region of the injection gates and its rotation clears the space above the mould cavities and allows a free passage for the moulded parts during their ejection. Moreover, this rotating second member once again sweeps through the space above the ejectors at the end of its rotation when the mould is completely open. The fitting between the two members defining the injection gates is advantageously achieved by means of conical surfaces.

BRIEF DESCRIPTION OF THE DRAWINGS

The operation of the mould will be understood with reference to the accompanying drawings, in which:

FIGS. 2, 3 and 4 show various positions of the rotating member.

DETAILED DESCRIPTION OF THE PREFERRED EMBODIMENT

Figure 1:
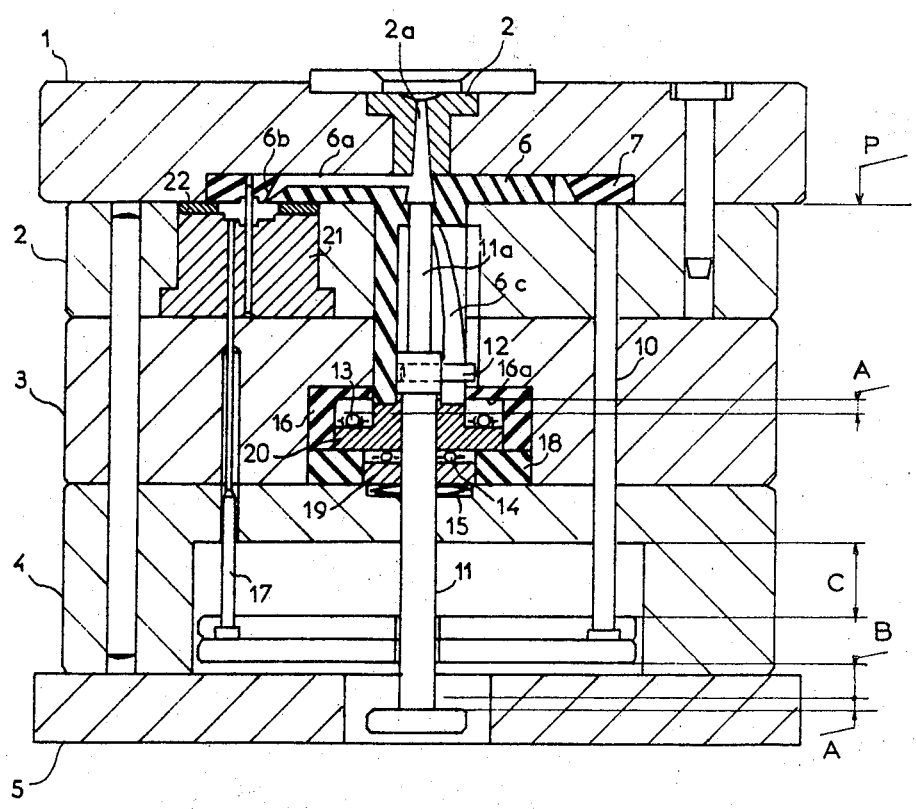
FIG. 1 is a sectional view of the mould.

The mould shown in FIG. 1 has a movable part comprising a movable block 1 in the centre of which is defined, through a member 2, the main injection passage 2a. This block further comprises a member 7 which is located at the level of the joint or parting plane P and in which are formed recesses corresponding to a part of the various mould cavities. The fixed part of the mould comprises a stock of blocks 2, 3, 4 and 5 through which extend ejectors 17 for the moulded parts, the ejector 11a for the residual material generally termed "sprue" and the rods 10 and 11, these blocks maintaining, members 18, 16, 19 and 20 trapped therein which constitute with balls 13 and 14 two thrust ball bearings one of which has a clearance A between the balls 13 and the face 16a. The stock of members 19, 14, 20, biased by a spring 15, is in contact with a centre member 6 having a helical ramp or cam 6c and recesses 6a constituting injection passages or runners pertaining to each mould cavity defined by the members 21-22 and terminating in a tapering cone 6b in contact with the member 7. The periphery of the rotatable member 6 has as many recesses 6d (FIG. 2) as there are mould cavities so as to provide, by rotation of the member 6, a passage for the corresponding moulded parts, when striping them from the mould.

At the start of the opening of the mould, the member 6, which is no longer held by the block 1, travels away from the parting plane P a distance A under the action of the spring 15 and this has the effect of breaking the injection gates 6b in the region of the moulded parts. Thereafter, the rod 11 rises (travel B + C) and ejects the sprue (residual material) through the agency of its extension 11a while rotating the member 6 owing to the action of a pin 12 which is secured to the rod 11 and travels along the ramp 6c. The beginning of this rotation $R_1$ (FIG. 3) causes the moulded parts to be disengaged after which they are ejected from their cavities by the ejectors 17. As the member 6 continues to rotate ($R_2$, FIG. 4), it again sweeps through the space above the mould cavities and this discharges the moulded parts which might otherwise remain adhered to their ejectors.

The device according to the invention may be employed in moulds for presses for the injection moulding of thermosetting or thermoplastic materials.

What I claim is:

1. A mould for a press for the injection of thermosetting or thermoplastic materials to form moulded articles, which mould opens in two parts along a parting plane and comprises: a fixed block and a movable block; a movable center member having an upper part thereof disposed in said movable block and contiguous with said parting plane, said upper part having formed therein injection passages terminating at the top of the mould cavities formed in said fixed block so that injection takes place through said passages and across said parting plane into said mould cavities; means operatively associating said center member with said fixed block, so that upon opening of the mould along said parting plane there occurs, a movement of translation and subsequent rotation of said center member to thereby effect shearing of residual material in said injection passages from said moulded articles and discharge of said material.

2. A mould as claimed in claim 1, wherein said center member is provided with a helical ramp on which acts a pin integral with an ejector for ejecting thermosetting or thermoplastic material.

3. A mould as claimed in claim 1, wherein said operatively a0sociating means includes a compression spring means interposed between said center member and said fixed block of said mould, said spring urging said center member to effect said movement of translation and rotation upon opening of the mould.

* * * * *

UNITED STATES PATENT OFFICE
CERTIFICATE OF CORRECTION

Patent No. __3,794,286__   Dated __February 26, 1974__

Inventor(s) __JEAN JULLIEN-DAVIN, Valence, France.__

It is certified that error appears in the above-identified patent and that said Letters Patent are hereby corrected as shown below:

[30] Foreign Application Priority Data

March 24, 1971   France   71 10763

Signed and sealed this 22nd day of October 1974.

(SEAL)
Attest:

McCOY M. GIBSON JR.
Attesting Officer

C. MARSHALL DANN
Commissioner of Patents